(12) United States Patent
Park

(10) Patent No.: US 11,485,324 B2
(45) Date of Patent: Nov. 1, 2022

(54) VEHICLE AND CONTROL METHOD THEREOF

(71) Applicants: Hyundai Motor Company, Seoul (KR); Kia Motors Corporation, Seoul (KR)

(72) Inventor: ChoongSeob Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 305 days.

(21) Appl. No.: 16/806,649

(22) Filed: Mar. 2, 2020

(65) Prior Publication Data

US 2021/0070254 A1    Mar. 11, 2021

(30) Foreign Application Priority Data

Sep. 11, 2019    (KR) .......................... 10-2019-0112850

(51) Int. Cl.
*B60S 1/08*    (2006.01)
*B60R 16/02*    (2006.01)

(52) U.S. Cl.
CPC .............. *B60S 1/0807* (2013.01); *B60S 1/08* (2013.01); *B60R 16/02* (2013.01)

(58) Field of Classification Search
CPC ........ B60S 1/08; B60S 1/0807; B60S 1/0818; B60S 1/0896
USPC .......................................... 15/250.12, 250.17
See application file for complete search history.

(56) References Cited

U.S. PATENT DOCUMENTS

2018/0093631 A1* 4/2018 Lee ...................... G06V 20/593
2018/0229692 A1* 8/2018 Li .......................... B60S 1/0896

FOREIGN PATENT DOCUMENTS

WO    2010/046303    *    4/2010

* cited by examiner

*Primary Examiner* — Gary K. Graham
(74) *Attorney, Agent, or Firm* — Fox Rothschild LLP

(57) ABSTRACT

A vehicle is provided to include a wiper, a wiper driver that is connected to the wiper and configured to provide a driving force for rotation of the wiper, and a multi-function switch that is configured to receive a user command to turn the wiper driver on or off. A controller is configured to adjust a position of the wiper to enter a parking state after a preset time when a local interconnect network (LIN) communication system enters a limp home mode and the rotation of the wiper is stopped by a signal for turning off the wiper driver.

7 Claims, 6 Drawing Sheets

VEHICLE AND CONTROL METHOD THEREOF

CROSS-REFERENCE TO RELATED APPLICATION(S)

This application is based on and claims priority under 35 U.S.C. § 119 to Korean Patent Application No. 10-2019-0112850, filed on Sep. 11, 2019, the disclosure of which is incorporated by reference herein in its entirety

BACKGROUND

1. Field of the Disclosure

The present disclosure relates to a vehicle and a control method thereof, and more particularly, to a method of controlling a wiper mounted on the vehicle.

2. Description of Related Art

A vehicle is equipped with various electronic devices that receive signals from a controller mounted therein. The vehicle implements a local interconnect network (LIN) communication system to communicate between the controller and the electronics. When an error occurs on the LIN communication system, the vehicle activates a limp home mode, thereby limiting the control of various power devices in addition to the electronics to prevent damage to the electronics of the vehicle.

For example, the vehicle is equipped with a wiper system that reciprocates the surface of the windshield to wipe off or remove any rain or snow on the surface. When the limp home mode enters activation while the wiper system is in operation, the wiper may be stopped while the driver's view is obstructed, thus interfering with the driver's view and increasing the risk of an accident.

SUMMARY

Therefore, the present disclosure provides a vehicle capable of preventing the wiper from obstructing the driver's field of view in the limp home mode, and a control method thereof.

In accordance with an aspect of the disclosure, a vehicle may include: a wiper; a wiper driver connected to the wiper and configured to provide a driving force for rotation of the wiper; a multi-function switch configured to receive a user command to turn the wiper driver on or off; and a controller configured to adjust a position of the wiper to enter a parking state after a preset time when a local interconnect network (LIN) communication system enters a limp home mode and the rotation of the wiper is stopped by a signal for turning off the wiper driver.

The vehicle may further include a counter configured to measure a waiting time after the rotation of the wiper is stopped, and the controller may be configured to adjust the position of the wiper to enter the parking state when the waiting time measured by the counter reaches the preset time. The controller may be configured to operate the wiper to maintain rotation of the wiper when the waiting time does not reach the preset time.

Additionally, the controller may be configured to initialize the waiting time measured by the counter when the waiting time does not reach the preset time and a signal for turning off the wiper driver is not detected. The controller may also be configured to operate the wiper driver not to provide a driving force to the wiper when the wiper is stopped in a parking state. The controller may be configured to operate the wiper driver not to provide a driving force to the wiper when the position of the wiper is stopped at a position equal to or less than a preset angle in the parking state. The preset time may be set according to user input.

In accordance with another aspect of the disclosure, a control method of vehicle may include: entering the vehicle's Local Interconnect Network (LIN) communication system into a limp home mode; receiving a user command to turn a wiper rotation on or off; and adjusting a position of the wiper to enter a parking state after a preset time when the rotation of the wiper is stopped by a signal for turning off the wiper rotation.

The control method may further include measuring a waiting time after the rotation of the wiper is stopped. The adjusting of the wiper position may include adjusting the position of the wiper to enter the parking state when the measured waiting time reaches the preset time. The wiper may be operated to maintain rotation thereof when the waiting time does not reach the preset time. Additionally, the adjusting of the wiper position may include initializing the measured waiting time when the waiting time does not reach the preset time and a signal for turning off the wiper rotation is not detected, The adjusting of the wiper position may further include not providing a driving force to the wiper when the wiper is stopped in a parking state. In addition, a driving force may not be provided to the wiper when the position of the wiper is stopped at a position equal to or less than a preset angle in the parking state. The preset time may be set according to user input.

BRIEF DESCRIPTION OF THE DRAWINGS

These and/or other aspects of the disclosure will become apparent and more readily appreciated from the following description of exemplary embodiments, taken in conjunction with the accompanying drawings of which.

DETAILED DESCRIPTION

Figure 1:
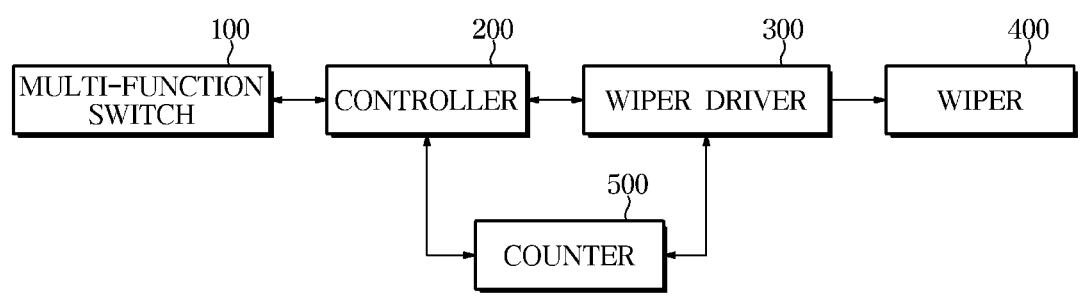
FIG. 1 illustrates a control block diagram of a vehicle according to an exemplary embodiment of the disclosure.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network. Also, when a part "includes" or "comprises" an element, unless there is a particular description contrary thereto, the part may further include other elements, not excluding the other elements.

Further, when it is stated that a layer is "on" another layer or substrate, the layer may be directly on another layer or substrate or a third layer may be disposed therebetween. It will be understood that, although the terms first, second, third, etc., may be used herein to describe various elements, it should not be limited by these terms. These terms are only used to distinguish one element from another element. As used herein, the singular forms "a," "an" and "the" are intended to include the plural forms as well, unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
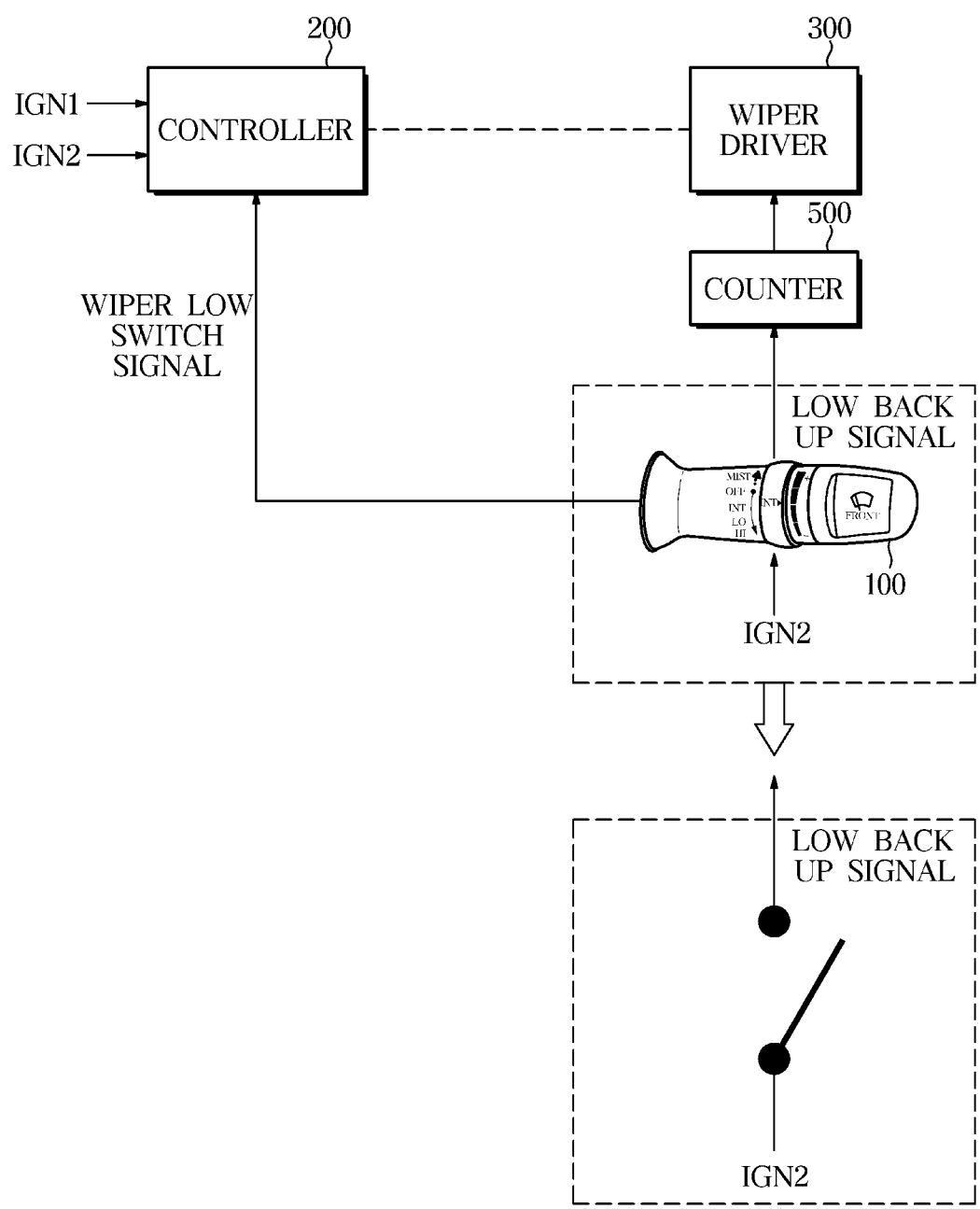
FIG. 2 illustrates a diagram for describing the control block diagram of FIG. 1 in more detail according to an exemplary embodiment of the disclosure.

Hereinafter, the operation principles and exemplary embodiments of the disclosure will be described with reference to the accompanying drawings. FIG. 1 illustrates a control block diagram of a vehicle according to an exemplary embodiment of the disclosure. FIG. 2 illustrates a diagram for describing the control block diagram of FIG. 1 in more detail The vehicle may include a multi-function switch 100 as one of various input devices provided for manipulating various functions or devices. The multi-function switch 100 may be connected to a point at which a steering wheel (not shown) and a dashboard (not shown) are connected. The driver may operate various functions of the wiper 400 by using the multi-function switch 100. The multi-function switch 100 may have various functions such as Mist, OFF, INT, LO, HI, and washer fluid injection. In particular, the wiper 400 may be disposed on the front of the vehicle to clean the surface of the wind shield.

The Mist is a function in which the wiper 400 operates once when the multi-function switch 100 is operated for less than a particular period of time, the OFF is a function that ends the driving or operation of the wiper 400, the INT is a function in which the wiper is operated intermittently at regular intervals, rather than continuously moving the wiper 400, and LO and HI refer to the function of adjusting the rotational speed of the wiper 400. The multi-function switch 100 may be configured to receive a user command for adjusting the on or off of the wiper driver 300.

The functions described above may be performed by moving the multi-function switch 100 up and down by the driver, and also by moving the multi-function switch 100 in the direction of the driver or the instrument panel or a command of using a throttle provided in the multi-function switch 100. Depending on the vehicle type, the input may be different for each function. The controller 200 may be configured to execute the operations of the wiper driver 300 that provide a driving force for rotation of the wiper 400, and the operations of the counter 500.

In particular, the controller 200 may be configured to receive a command for the multi-function switch 100 of the driver and execute an operation function of the wiper 400 corresponding to the command of the driver. The controller 200 may be configured to operate the wiper driver 300 based on the signal transmitted from the counter 500. Functions and operations related to the counter 500 will be described later. Each configuration module of the controller 200 may exist respectively and may be configured through one embedded system. In other words, the controller 200 may be integrated in a system on chip (SOC) embedded in a vehicle and may be operated by at least one processor. However, since there is not only one system on chip embedded within the vehicle and there may be a plurality of system on chips, the controller is not limited to being integrated into one system on chip.

Furthermore, the wiper driver 300 may be physically connected to the wiper 400 to provide rotational force to the wiper 400. The wiper driver 300 may be configured to adjust the driving of the wiper 400 based on the control signals transmitted from the controller 200 and the counter 500. For example, the wiper driver 300 may include a motor (not shown). In addition, the wiper driver 300 may be equipped with a separate or integrated control circuit to operate the wiper 400 based on control signals transmitted from the controller 200 and the counter 500.

The counter 500 may be configured to generate a signal when a predetermined time elapses from a certain time point to set the conditions for the start and end of the wiper 400 operation with respect to time. In particular, the counter 500 may correspond to a separate hardware module connected to the controller 200, but may be a software module integrally implemented with the controller 200.

Referring to FIG. 2, various signals for operating the wiper 400 will be described in detail. Particularly, IGN 1 and IGN 2 shown in FIG. 2 refer to a power supply for supplying power to the various electronics, supplies power to operate the mechanical device, the electronics and the wiper 400 of the vehicle. The wiper driver 300 may be configured to receive various signals from the controller 200 via a local interconnect network (LIN) communication system. For example, the wiper driver 300 may be configured to start and end the operation of the wiper 400 by a signal for turning on the driving of the wiper 400 (Wiper Low Switch) and a signal for turning off the driving of the wiper 400 (Low Back up), In general, when the LIN communication system is operating normally (e.g., without error or malfunction), the wiper driver 300 may be configured to receive a signal input to the multi-function switch 100 via the LIN communication system. In contrast, when the LIN communication system is abnormally operated (e.g., with failure or malfunction), the vehicle control system may be configured to enter a limp home mode. The limp home mode refers to a protection mode corresponding to abnormal operation of components operating in association with the controller 400. When entering the limp home mode, the wiper driver 300 may be configured to receive only an off signal, that is, a low back up signal, to protect the wiper control system. In particular, the wiper driver 300 may be configured to receive an off signal by a switching device directly connected to the multi-function switch 100.

On the other hand, during the operation of the wiper 400, when entering the limp home mode and in response to receiving a driver input for a command to turn off the operation of the wiper 400 through the multi-function switch 100, the operation of the wiper 400 may be stopped immediately. Therefore, the wiper 400 may remain in a position that may obstruct the driver's view, which may cause an accident while driving.

The present disclosure, however, prevents the above-described risk, and adjusts the driving of the wiper 400 based on the counter 500 that may generate a signal after a predetermined time elapses. For example, the controller 200 may be configured to adjust the position of the wiper 400 to automatically enter a parking state based on the time measured by the counter 500 after stopping the rotation of the wiper 400 by limp home mode. Particularly, the parking state is an initial position of the wiper 400, and indicates a state in which the driver's front view may be completely secured since the wiper 400 is disposed close to the bonnet of the vehicle. Therefore, despite the abnormal operation of the wiper 400 by the limp home mode, the driver may secure a forward view.

According to an exemplary embodiment, the controller 200 may be configured to operate the wiper 400 to enter a parking state after a preset time when the LIN communication system enters limp home mode and the rotation of the wiper 400 is stopped by a signal input to the multi-function switch 100 for turning off the wiper driver 300. In addition, according to one exemplary embodiment the vehicle may further include a counter 500 configured to measure the waiting time after the rotation stop of the wiper and the controller 200 may be configured to operate the wiper 400 to enter the parking state when the waiting time measured by the counter 500 reaches the preset time.

Figure 3:
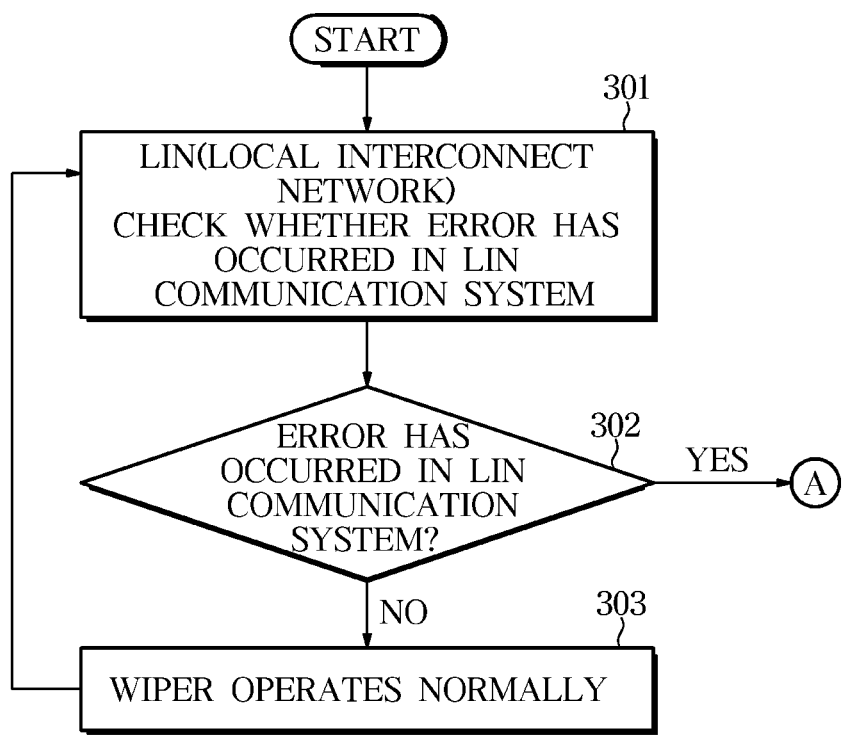
FIGS. 3 and 4 illustrate flowcharts of a control method of the vehicle according to an exemplary embodiment of the disclosure.
Figure 4:
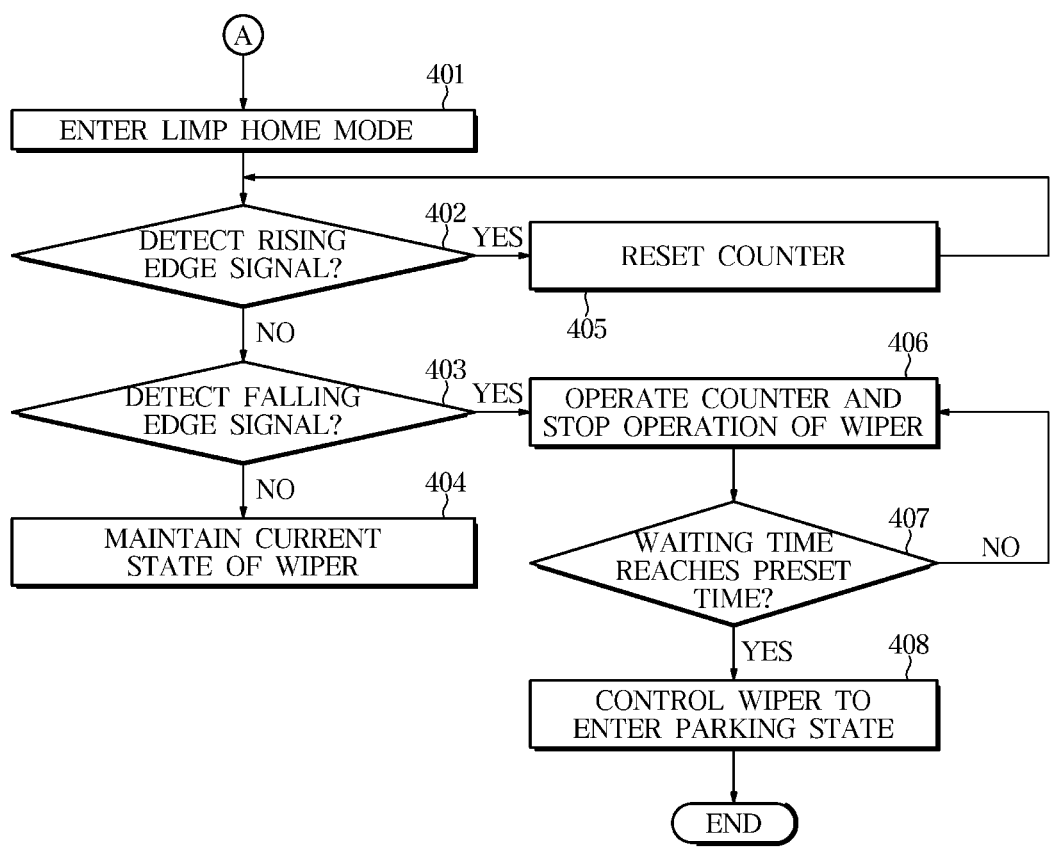

The configuration and basic control operation for performing the control operation of the disclosed disclosure has been described. Hereinafter, various exemplary embodiments will be described based on the above-described configuration and basic control operation with reference to FIGS. 3 to 6. FIGS. 3 and 4 illustrate flowcharts of a control method of the vehicle according to an exemplary embodiment of the disclosure. However, this is merely an exemplary embodiment for achieving the object of the disclosure, some steps may be added or deleted as necessary.

Moreover, the controller 200 may be configured to check whether an error has occurred in the LIN communication system of the vehicle (301). In response to determining that no error has occurred in the LIN communication system (302), the controller 200 does not perform a separate control operation since the wiper is in a normal operating state (303). The controller 200 checks whether an error has occurred in the LIN communication system through a feedback in response to the request command and the request command between the master node and the slave node of the LIN communication system. Meanwhile, a control operation when an error occurs on the LIN communication system will be described with reference to FIG. 4.

Each of the rising edge signal and the falling edge signal referred to in FIG. 4 represents a signal of the wiper driver 300 for turning on or off the driving of the wiper 400 through the multi-function switch 100 by user in a digital signal manner. The falling edge signal is a signal for turning off the driving of the wiper 400, and the rising edge signal indicates a signal other than a signal for turning off the driving of the wiper 400.

When the controller 200 detects that an error has occurred on the LIN communication system (302 of FIG. 3), the controller 200 may be configured to enter a limp home mode (401). When the controller 200 detects the rising edge signal while entering the limp home mode (402), the controller 200 may be configured to reset the counter 500 (405). This will be described in more detail with reference to FIG. 5.

Figure 5:
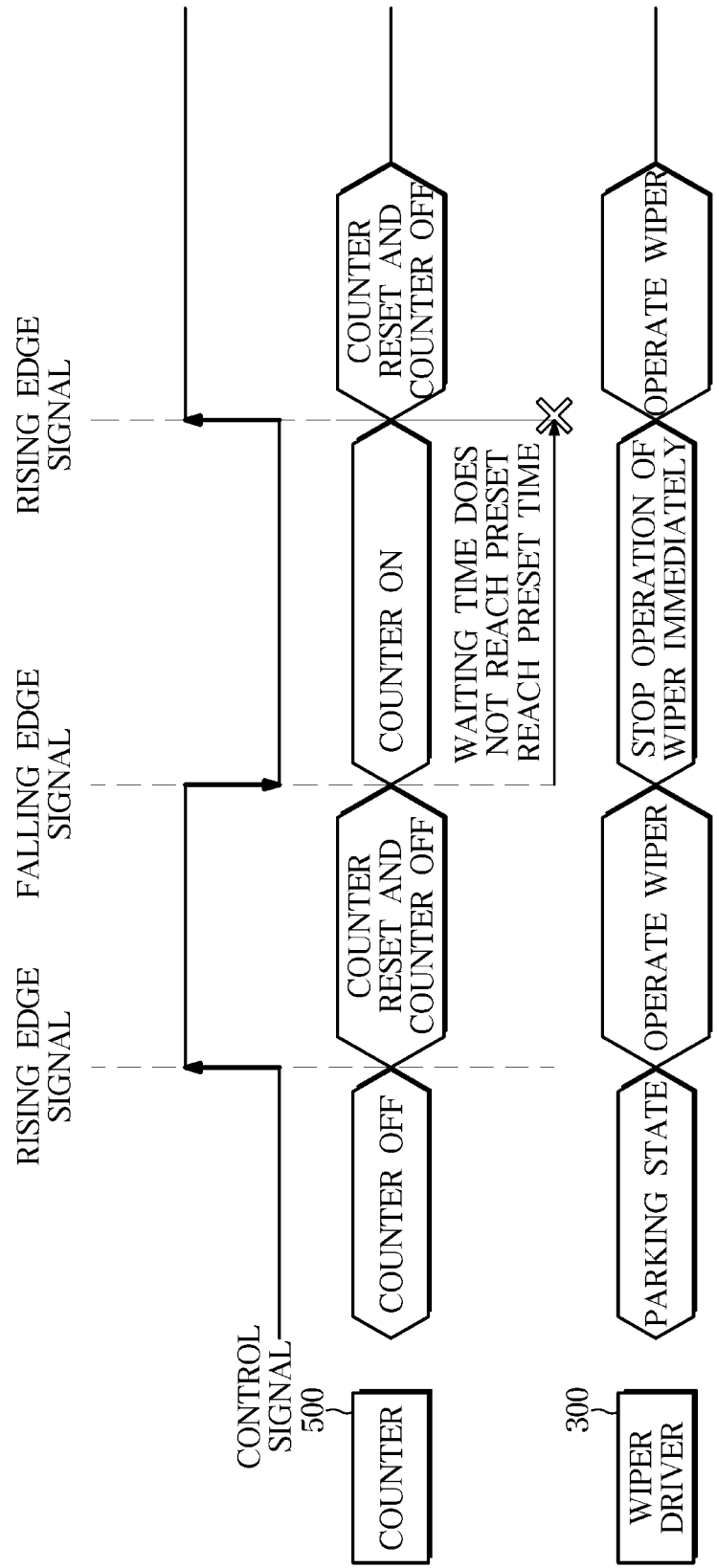
FIGS. 5 and 6 illustrate timing diagrams of wiper driving according to waiting times of counter according to an exemplary embodiment of the disclosure.

Referring to FIG. 5, when a rising edge signal is detected at the first rising edge signal timing, the operation of the wiper 400 may be maintained. In particular, since the wiper 400 is still in the operating state, the counter 500 may be reset or turned off. Subsequently, when the falling edge signal is detected, the wiper 400 may be stopped immediately by the protective action of the limp home mode. Additionally, the counter 500 may enter the on state and may be configured to measure the time that elapses after the wiper 400 is stopped. When the rising edge signal is detected while the waiting time does not reach the preset time (e.g., before the waiting time has elapsed), the operation of the wiper 400 may be restarted, and the counter 500 may be configured to reset the previously measured waiting time and enter the off state. After the wiper 400 is stopped, the wiper 400 may be restarted by the driver to prevent obstruction of the driver's view.

According to an exemplary embodiment, the controller 200 may be configured to maintain the rotation of the wiper 400 when the waiting time does not reach the preset time. At this time, the preset time may be set by the driver. For example, the preset time may be set to various times through a user setting menu (USM) provided by an audio video navigation (AVN) device mounted within a vehicle. In addition, according to an exemplary embodiment, the controller 200 may be configured to initialize the waiting time measured by the counter 500 when the waiting time does not reach the preset time and a signal for turning off the wiper driver 300 is not detected.

When the controller 200 detects the falling edge signal in the state of entering the limp home mode (403), the counter 500 may be configured to start the operation for measuring the waiting time. At this time, the wiper 400 may be stopped in response to the detection of the falling edge signal (406). The above-described steps 406 to 408 will be described in more detail with reference to FIG. 6.

Figure 6:
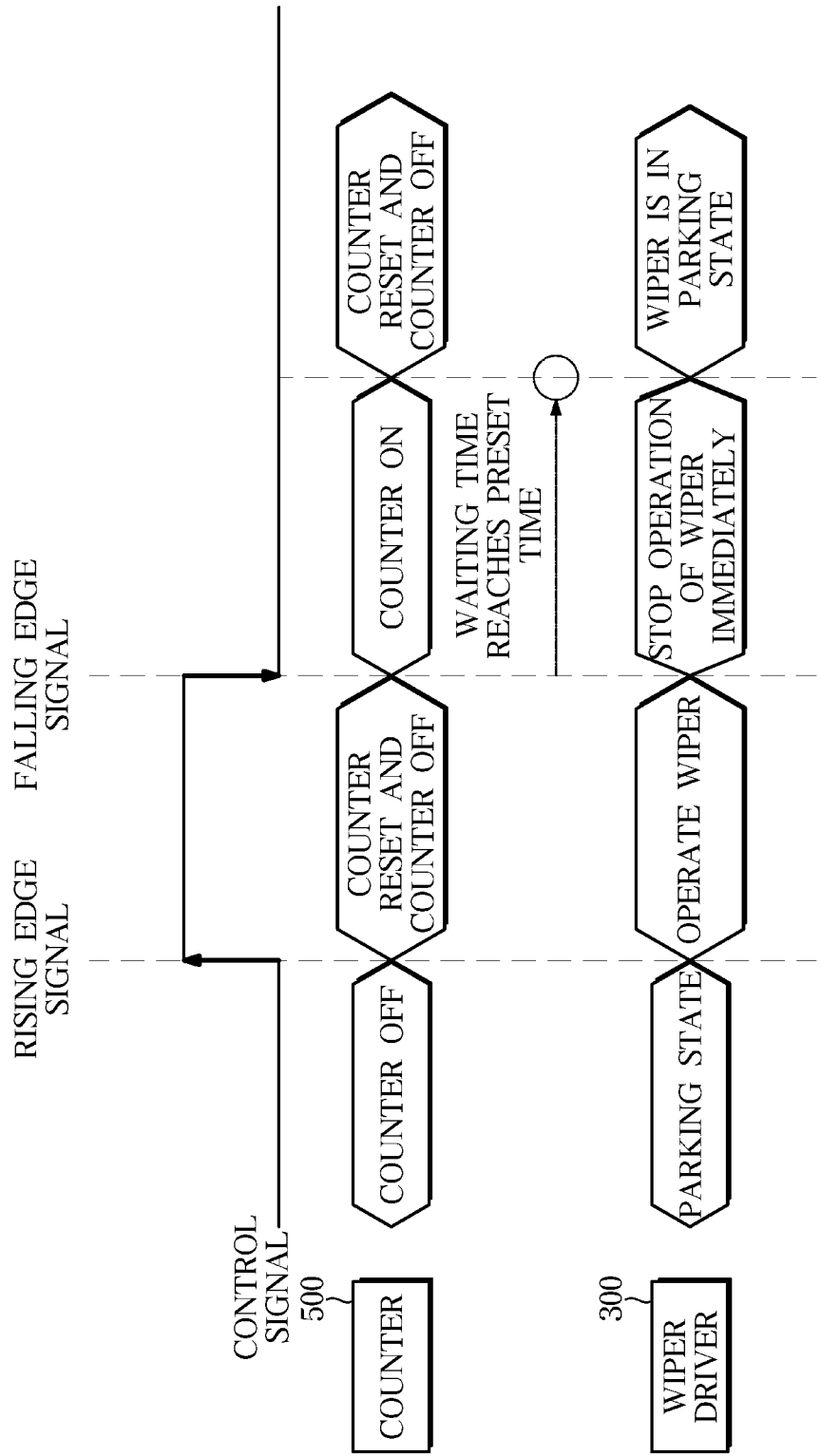

Referring to FIG. 6, when the rising edge signal is detected at the first rising edge signal timing, the operation of the wiper 400 may be maintained. At this time, since the wiper 400 is still in the operating state, the counter 500 may be reset or turned off. Subsequently, when the falling edge signal is detected, the wiper 400 may be stopped immediately by the protective action of the limp home mode. The counter 500 may be configured to enter the on state and measure the time that elapses since the wiper 400 is stopped. At this time, when the waiting time measured by the counter 500 reaches a preset time (407), the controller 200 may be configured to adjust the position of the wiper 400 to enter the parking state (408).

However, the above-described control operation may be performed only when the wiper 400 is stopped at a position that obstructs the driver's view on the wind shield. According to an exemplary embodiment, when the wiper 400 is stopped in the parking state, the controller 200 may be configured to operate the wiper driver 300 not to provide a driving force to the wiper 400. In particular, since the driver's field of view is secured, unnecessary control operation may be prevented and power waste due to the driving of the wiper 200 may be prevented.

Further, according to an exemplary embodiment, the controller 200 may be configured to operate the wiper driver 300 not to provide a driving force to the wiper 400 when the position of the wiper 400 is stopped at a position equal to or less than a preset angle in the parking state. The present exemplary embodiment reflects that the wiper 400 is slightly lifted in the parking state, which may not interfere with the driver's view. The preset angle may vary based on the driver's settings. According to an aspect of the disclosure, it may be possible to prevent the driver's view from being obstructed by the abnormal operation of the wiper in limp home mode.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium. The non-transitory computer-readable recording medium may include all kinds of recording media storing commands that may be interpreted by a computer. For example, the non-transitory computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle, comprising:
    a wiper;
    a wiper driver connected to the wiper and configured to provide a driving force for rotation of the wiper;
    a multi-function switch configured to receive a user command to turn the wiper driver on or off; and
    a controller configured to adjust a position of the wiper to enter a parking state after a preset time when a local interconnect network (LIN) communication system enters a limp home mode and the rotation of the wiper is stopped by a signal for turning off the wiper driver.

2. The vehicle of claim 1, further comprising:
    a counter configured to measure a waiting time after the rotation of the wiper is stopped,
    wherein the controller is configured to adjust the position of the wiper to enter the parking state when the waiting time measured by the counter reaches the preset time.

3. The vehicle of claim 2, wherein the controller is configured to maintain rotation of the wiper when the waiting time does not reach the preset time.

4. The vehicle of claim 2, wherein the controller is configured to initialize the waiting time measured by the counter when the waiting time does not reach the preset time and a signal for turning off the wiper driver is not detected.

5. The vehicle of claim 2, wherein the controller is configured to operate the wiper driver not to provide a driving force to the wiper when the wiper is stopped in a parking state.

6. The vehicle of claim 2, wherein the controller is configured to operate the wiper driver not to provide a driving force to the wiper when the position of the wiper is stopped at a position equal to or less than a preset angle in the parking state.

7. The vehicle of claim 2, wherein the preset time is set according to user input.

* * * * *